No. 671,795. Patented Apr. 9, 1901.
M. C. FORESMAN.
COVER FOR COOKING UTENSILS.
(Application filed Sept. 26, 1900.)
(No Model.)
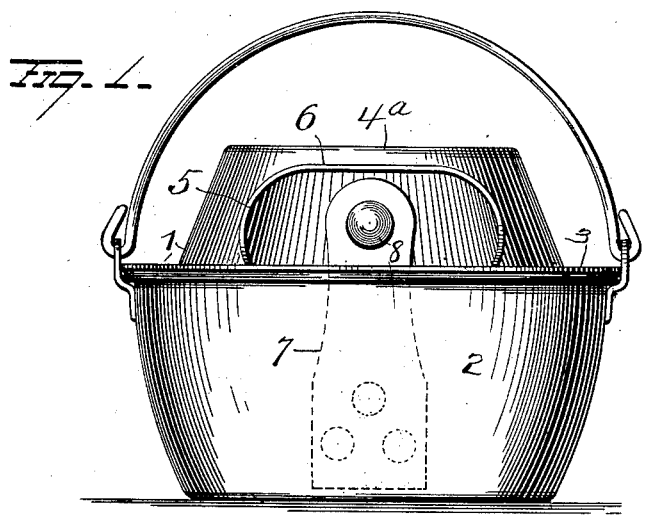
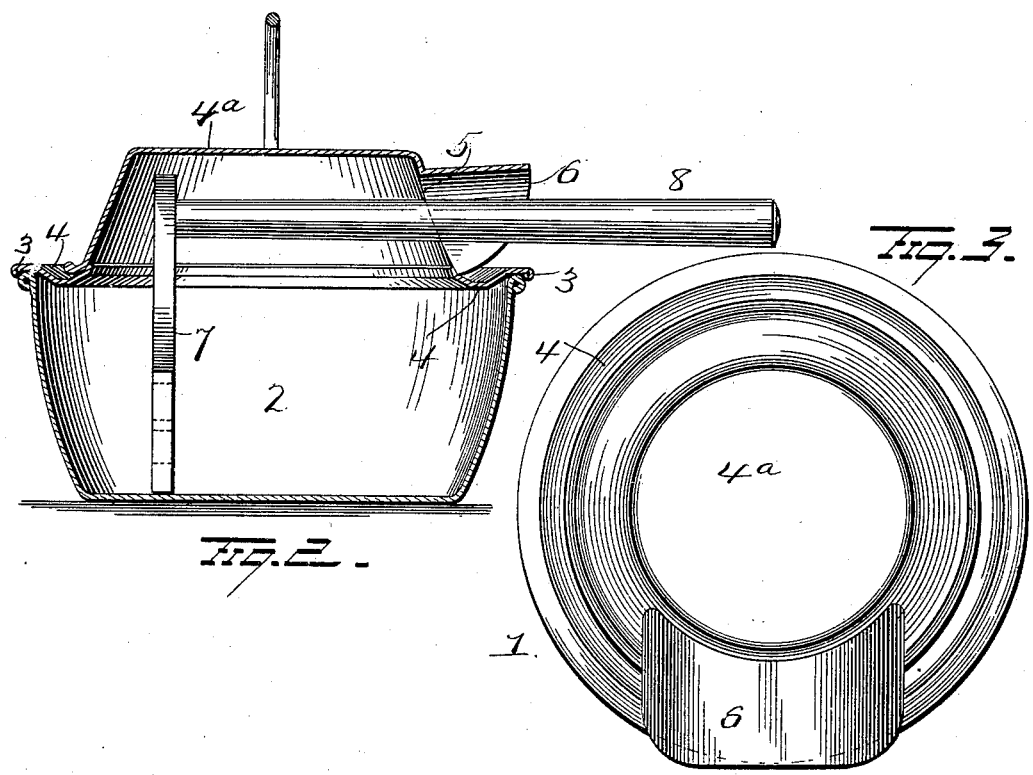
WITNESSES
E. J. Nottingham
G. F. Downing
INVENTOR
M. C. Foresman
By H. A. Seymour
Attorney

UNITED STATES PATENT OFFICE.

MARGARET C. FORESMAN, OF LINDEN, PENNSYLVANIA.

COVER FOR COOKING UTENSILS.

SPECIFICATION forming part of Letters Patent No. 671,795, dated April 9, 1901.

Application filed September 26, 1900. Serial No. 31,180. (No model.)

*To all whom it may concern:*

Be it known that I, MARGARET C. FORESMAN, a resident of Linden, in the county of Lycoming and State of Pennsylvania, have invented certain new and useful Improvements in Covers for Cooking Utensils; and I do hereby declare the following to be a full, clear, and exact description of the invention, such as will enable others skilled in the art to which it appertains to make and use the same.

My invention relates to an improved cover for cooking utensils, the object of the invention being to provide a device of this character which will permit of the stirring of the contents of the utensil while the cover is in place.

With this object in view the invention consists in certain novel features of construction and combinations and arrangements of parts, as will be more fully hereinafter described, and pointed out in the claim.

In the accompanying drawings, Figure 1 is a view in elevation illustrating my improvements. Fig. 2 is a view in section, and Fig. 3 is a view of the cover removed.

1 represents my improved cover, supported on a cooking utensil 2 of any approved construction. The cover 1 is composed, preferably, of sheet metal, having a rolled edge 3 to fit around the utensil 2 and having a circular depression 4 to fit into the utensil, which together with the rolled edge 3 comprises a supporting-base and will permit the cover to sit evenly on the utensil without danger of its accidental displacement. The center of the cover is made in the form of an upwardly-projecting dome $4^a$, constituting a condenser and having a slot or opening 5 in its wall of sufficient size to permit the insertion and withdrawal of a stirrer, and an outwardly-projecting hood 6 is located around the slot or opening 5 and also serves to condense the cooler vapors which may escape through the opening. It will thus be seen that a stirrer can be inserted through the opening 5 to stir the contents of the utensil 2, thus dispensing with the necessity of removing the cover, which would cool the material in the utensil, while with the cover in place the material is cooked much more rapidly, as is well understood. The hood 6 will assist in preventing splashing of the contents of the utensil while it is being stirred.

A stirrer 7, having its handle 8 projecting at right angles thereto, is preferably employed, as this will enable the operator to more effectually move the stirrer about the utensil; but other forms of stirrer might be employed and, if desired, the hood 6 may be dispensed with, as the essential feature of my invention is a cover for a cooking utensil having an opening therein for the insertion and withdrawal of a stirrer.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

A cover for a cooking utensil comprising a base, an approximately vertical dome having an opening in its wall below its top and of proper size and shape to permit the passage through it of the head of a stirrer, and a hood projecting from the wall of the dome to inclose said opening, said dome and head constituting a trap to facilitate the condensation of steam.

In testimony whereof I have signed this specification in the presence of two subscribing witnesses.

MARGARET C. FORESMAN.

Witnesses:
    GEORGE P. NEAL,
    KIMBALL S. MILLER.